June 27, 1939.   F. J RAYBOULD   2,163,810
COUPLING
Filed Nov. 25, 1936
Fig.1.
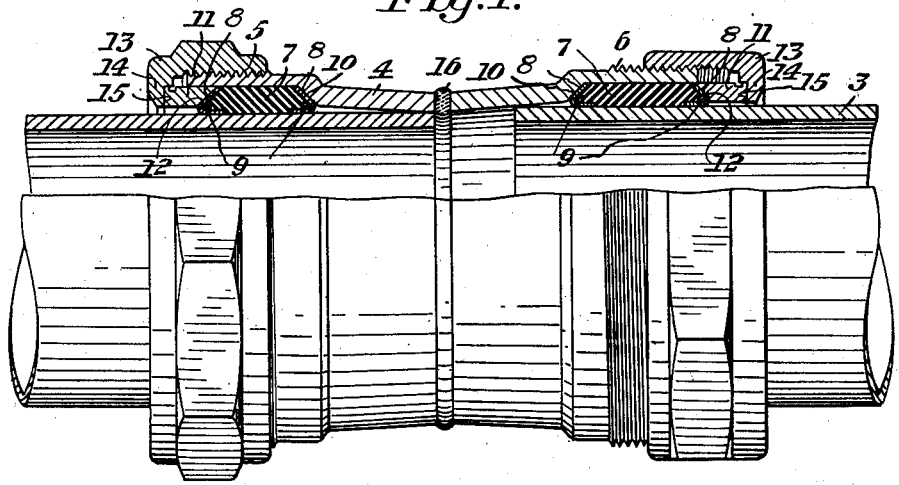
Fig.2.  Fig.3.
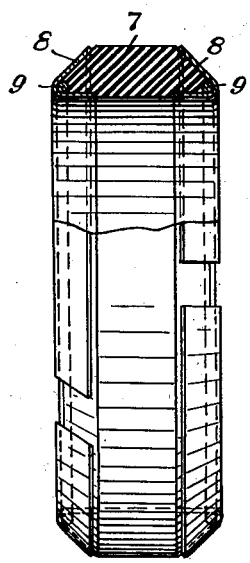 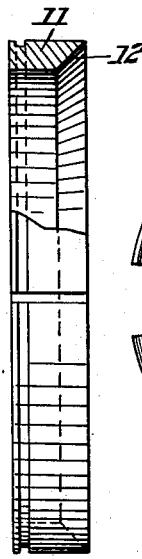
Fig.4.
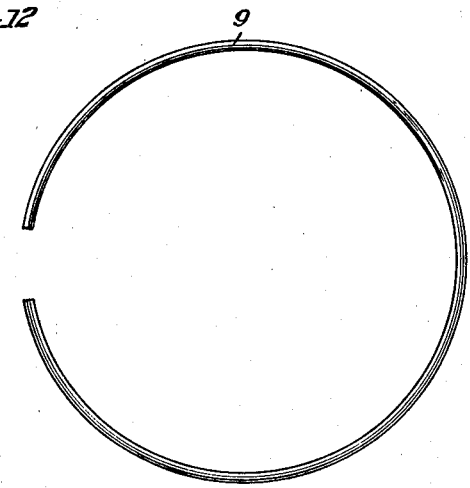
Fig.5.
INVENTOR
Frank J. Raybould
by his attys.
Stebbins, Blenko + Parmelee Patented June 27, 1939

2,163,810

UNITED STATES PATENT OFFICE 2,163,810

COUPLING

Frank J. Raybould, Erie, Pa., assignor to Raybould Coupling Company, Meadville, Pa., a corporation of Pennsylvania Application November 25, 1936, Serial No. 112,728

1 Claim. (Cl. 285—196)

The present invention relates to couplings and more particularly to couplings wherein the parts to be connected are not provided with screw threads or any other positive interlocking parts. Many of such connections are subjected to very severe strains, particularly where they are used for pipe or conduit connections. Some conduits, such as high pressure lines, are subjected to tremendous pressure in order to increase the quantity of fluid flowing through them and it is difficult to provide a connector which will withstand the pressures to which the conduits are subjected without becoming loosened and causing a leaky joint. Pressures in such lines are frequently sufficiently high to completely blow out the ordinary gasket where it is attempted to use a connection employing an ordinary gasket. Other forms of conduits, such as thin walled conduits, may be so thin as to exclude the use of threads upon them and difficulty is experienced in connecting such conduits so as to form a sealed joint and a joint of sufficient tensile strength to permit of the use of such conduits in their ordinary environments. Connectors such as those shown in my prior Patent No. 1,955,832, as well as the connector provided by my present invention, obviate the difficulties heretofore encountered, particularly in high pressure lines and in the uniting of thin walled conduit.

The present invention not only provides a coupling or connection which overcomes the difficulties heretofore encountered in high pressure lines and in the uniting of thin walled conduit, but it provides a coupling or connector of comparatively universal application and makes it possible to connect two members without threads and by engagement with the walls of the members.

In accordance with the present invention a connection is effected between an inner member and an outer member which may be either a middle ring to be similarly connected at its other end to another inner member or the outer member may be a conduit or tube of sufficient size to extend over the inner member and provide sufficient clearance therebetween to permit interposing a bushing unit between the two members. In the accompanying drawing, the showing of which is to be discussed more specifically hereinafter, the present invention is shown applied to the connection of two pipes which are of substantially the same diameter and in further discussing the present invention it will be described as applied to connecting two such pipes together. It will be understood, however, that my invention is applicable to various different types of installations embodying an inner member and an outer member, the outer member being sufficiently larger than the inner member to provide sufficient space for the bushing which effects the connection between the two members. It will also be understood that my invention is not limited to the connection of conduit but may be applied where the connected members are solid and where they are of various shapes.

The present invention contemplates the use of a bushing unit including a compression ring which surrounds the inner member and which is formed of a material which is substantially incompressible but readily distortable so that when pressure is applied axially to the compression ring it will be expanded radially and brought into intimate and strong contact with the inner and outer members. The present invention also contemplates the use of one or more split or slotted bushings adapted to extend circumferentially around the compression ring and angularly about the edges thereof to confine the compression ring so that when axial pressure is applied thereto by appropriate means all of the pressure applied axially will be expended in a radial direction. The present invention also contemplates the use of split or slotted reinforcing rings for reinforcing the compression ring. I have found it desirable to provide such reinforcing rings adjacent the edges of the compression ring and more particularly in the angles of the bushings. When the reinforcing rings are placed in this position they not only aid in reinforcing the compression ring but they also reinforce the split bushings so as to preclude destruction of the bushings when they are subjected to the tremendous pressures necessary to effect a proper connection in certain installations. The present invention also contemplates the use of a spacer ring extending circumferentially around the inner member to be united and between the inner and outer members, the spacer ring abutting against one end of the bushing unit and providing a means of transmitting pressure from the pressure applying means directly to the bushing unit without subjecting the bushing or compression ring to the frictional forces which would be present if the rotatable pressure applying means came in contact directly with the bushing unit. The spacer ring may be either solid or split, preferably split.

The present invention also contemplates threaded pressure applying means cooperating with threads on the outer member and arranged to force the spacer ring into heavy pressure contact with one end of the bushing unit to contract the bushing unit axially and expand it radially.

The advantages of a construction of the above character will be apparent to those skilled in the art. By the provision of a spacer ring extending between the rotatable pressure applying means and the bushing unit all wear upon the bushing unit is precluded. In addition, the spacer ring provides a face cooperating with the rotatable pressure applying means which can be smoothly machined so as to reduce the pressures required in order to effect the desired connection. This is due to the reduction of frictional forces which would be present if the rotatable pressure applying means cooperated directly with the compression ring of distortable material or a split or slotted bushing such as is preferably provided circumferentially around each end of the compression ring. In addition, the extension of the outer member over the top of the bushing unit when subjected to pressure and thus presenting a flat stationary surface to the top thereof tends to prevent any of the distortable material from being forced from its proper confining chamber which is sometimes incident to the use of a construction such as is shown in Figures 15 and 17 of my prior Patent No. 1,955,832. Other advantages of a connector of the character above described will be apparent to those skilled in the art.

In the accompanying drawing I have shown, for purposes of illustration only, a preferred embodiment of my invention.

Figure 1 is an elevational view, partly in section, of a connection between two pipes of slightly different diameters;

Figure 2 is a detail view, partly in section, of the bushing unit of the structure shown in Figure 1;

Figure 3 is a detail view, partly in section, of the spacer ring shown in Figure 1;

Figure 4 is a detail view of a reinforcing ring; and

Figure 5 is a detail view, partly in section, of one of the bushings of the structure shown in Figure 1.

In the installation shown in the drawing the pipes 2 and 3 are to be connected together. The outer member or middle ring 4 is tubular in shape and is placed over the ends of the pipes 2 and 3. This outer member is provided with threaded portions 5 and 6 at the ends thereof, and it is of sufficient length to extend over a substantial portion of the bushing units before axial pressure is exerted thereon and to extend completely over the bushing units to be interposed between the outer member and the pipes 2 and 3 when pressure has been applied to the units.

As shown, each bushing unit consists of a compression ring 7 of distortable material, preferably resilient rubber, which extends circumferentially around the inner member. Each bushing unit is also provided with bushings 8 which extend circumferentially around the compression ring and angularly about edges thereof. These bushings 8 are split or slotted so that when axial pressure is applied to the bushing unit they will be contracted and fit tightly around the inner member. Each bushing unit is also provided with split reinforcing rings 9, each of which is positioned adjacent an edge of the compression ring. These reinforcing rings, as shown in the drawing, are preferably positioned in the angles of the bushings so as to not only reinforce the compression ring but to reinforce the split or slotted bushings and prevent them from being bent out of shape when subjected to pressure. Each bushing unit is positioned between an inner member and the outer member 4. The configuration of the outer member 4 intermediate its ends is such as to provide angular faces 10 which are adapted to prevent the adjacent bushing unit from axial movement when subjected to pressure by the pressure applying means for distorting the bushing unit axially and radially.

A spacer ring 11 is provided for each bushing unit. Each spacer ring is provided with an angular face 12 adapted to cooperate with the outer end of a bushing unit. Each spacer ring is of such size as to permit it to extend between the inner and outer members and abut a bushing unit.

Pressure is applied to each bushing unit through a spacer ring 11 by means of a threaded sleeve 13. Each sleeve is threaded either interiorly or exteriorly for cooperation with a threaded section of the outer member 4. Each sleeve is provided with a downwardly extending portion 14 having a face 15 adapted to bear against a spacer ring 11 so that upon threading of the sleeve upon a threaded section of the outer member it forces a spacer ring against the bushing unit and by continued rotation thereof contracts the bushing unit axially and expands it radially into tight engagement with the inner and outer members.

In connections of this character it is desirable to maintain the pipes 2 and 3 spaced apart to some extent. For this purpose the middle ring 4 is provided with a weld 16 which extends circumferentially therearound adjacent the center thereof so that as the pipes 2 and 3 are placed in position within the outer member or middle ring 4 they will be spaced apart by a distance at least as great as the width of the weld.

I have found that a connection of this character is highly satisfactory and may be effected with a minimum of effort. I have also found that by virtue of the extension of the middle ring completely over the bushing units there is little or no tendency for the escape of the resilient material of the compression ring around the edges of the split bushings, thus insuring a tight and permanent connection. I have also found that it is of considerable advantage to prevent the rotatable pressure applying means from coming into direct contact with the bushing unit, as all wear on the bushing unit is thereby eliminated and all possibility of the parts binding during installation obviated.

While I have described an embodiment of my invention utilizing two bushing units, it will be readily apparent to those skilled in the art that the present invention is applicable to an installation where but one such unit is necessary, for example, in the connection of a conduit line to a tubular extension of a conduit box. It will be understood that my invention is not otherwise limited to the specific details of the structure disclosed in the drawing as it may be otherwise embodied within the scope of the appended claim.

I claim:

A coupling for joining together pipe members in substantially axial alinement comprising a compression ring extending circumferentially around each pipe member adjacent an end thereof, a middle ring having an enlarged portion on each end thereof extending substantially completely over the adjacent compression ring and a central portion tapering inwardly from each enlarged portion toward the center of the ring to provide stop faces for accommodating pipes of varying diameters between said end portions, each of said end portions being threaded, and threaded pressure applying means cooperating with each end portion of said middle ring for compressing each compression ring axially and expanding it radially into tight engagement with its pipe member.

FRANK J. RAYBOULD.